United States Patent Office 2,780,183
Patented Feb. 5, 1957

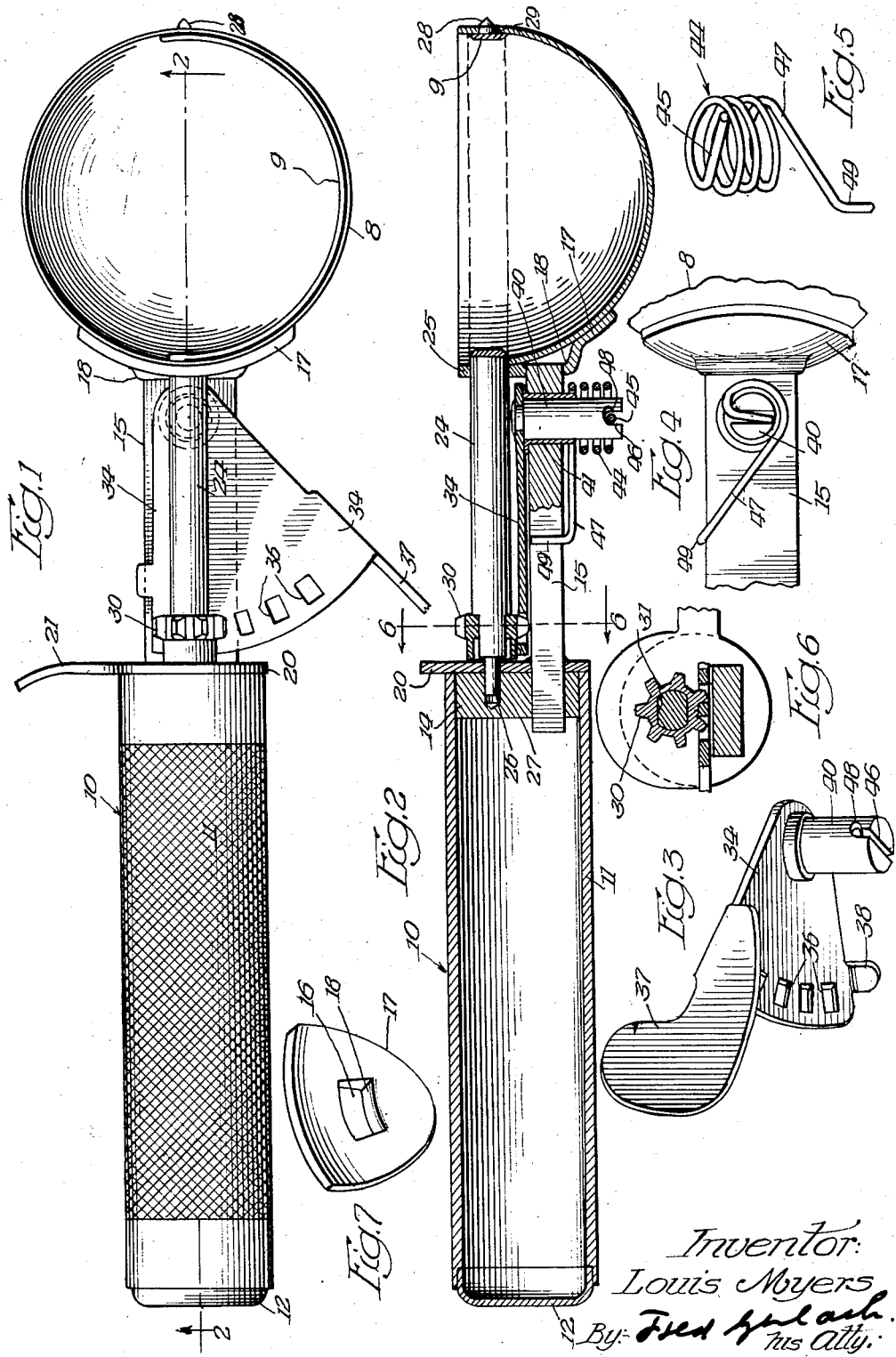

2,780,183

ICE CREAM DISHER

Louis Myers, Rockford, Ill.

Application November 12, 1953, Serial No. 391,541

1 Claim. (Cl. 107—48)

The invention relates to ice cream dishers.

One object of the invention is to provide a construction for a disher, which includes parts, such as a lever, scraper and shaft and can be readily assembled and disassembled for cleaning or repair.

Another object of the invention is to provide a disher which includes a torsion spring for retracting the scraper and its operating lever which is adapted to hold the lever in connected relations to the shank, is self retaining in its operating position, and can be easily detached from the shank and the lever for releasing the spring pressure on the lever.

Other objects will appear from the detailed description.

The invention consists in the several novel features hereinafter set forth and more particularly defined by claim at the conclusion hereof.

In the drawings:

Fig. 1 is a plan view of a disher embodying the invention;

Fig. 2 is a section taken on line 2—2 of Fig. 1;

Fig. 3 is a perspective view of the operating lever;

Fig. 4 is an inverted plan view of the torsion spring and associated parts;

Fig. 5 is a perspective view of the torsion spring;

Fig. 6 is a section taken on line 6—6 of Fig. 2; and

Fig. 7 is a perspective view of the reinforcing plate on the bowl to which the shank is secured.

The invention is exemplified in a disher comprising a hemispherical bowl or scoop 8, a resilient semi-circular scraper or blade 9 which is rotatable to sweep across the inner periphery of the bowl for separating the material and discharging it from the bowl, as well understood in the art. A handle generally designated 10 comprises a tubular grip 11, a cap 12 for closing the outer end of the grip 11 and a head 14 fitting in the inner end of said tubular section. A stem or shank 15, rectangular in cross-section, has one of its ends extending through a hole of conforming contour in head 14, and its other end extending through a plate 17 which is brazed to the outer face of the bowl 10 for supporting the bowl in fixed relation to the handle. Plate 17 has a curved face which conforms to the outer periphery of the bowl and is first spot welded and then brazed thereto, and is provided with an offset 18 with a hole 16 which conforms to the cross-section of the stem. The end of the stem adjacent the bowl is brazed in hole 16. The opposite end of stem 15 is brazed in the head 14 and the latter is brazed in the tubular handle grip 13. An end plate 20 with a lateral extension 21, which constitutes a finger stop, is brazed to the contiguous side face of head 14 and end face of the tubular grip. By this construction the handle, stem and bowl are economically and permanently secured together for supporting the bowl and handle in fixed relation. The outer surfaces of the joints or seams between shank 15 and plate 17 and between the plate 17 and the bowl are covered with solder to prevent moisture on said surface from causing corrosion.

A shaft 24 to which the inner end of scraper 9 is fixedly attached, extends through a bearing 25 in the bowl 8 and plate 17, and is provided with a pintle 26 which is journalled in a bearing 27 in head 14. The outer end of scraper 8 is provided with a trunnion 28 which is journalled in a bearing 29 in the bowl. The resiliency of the scraper permits the trunnion 28 to be disengaged from bearing 29 and moved out of the bowl, so the shaft 24 can be slidably withdrawn through bearing 25 and the pintle 26 to be slidably withdrawn from bearing 27 in head 14 for removal of the shaft and a scraper from the bowl.

The scraper 8 and shaft 24 are rotated in strokes of about one-half revolutions for discharging the material from the bowl by a pinion 30 which is slidably fitted on a flat portion 31 of said shaft. The flat portion 31 of shaft 24 is slidable out of the pinion 30 when removing the shaft from the bowl. A lever 34, which is pivotally mounted on the stem 15, is povided with a series of teeth 36 which mesh with the teeth of pinion 30 for rotating shaft 24. A thumb piece 37 is integral with one side of lever 34 and is operable by the operator's hand which grips the handle. The thumb piece 37 and a stop lug 38 strike the side of the shank 15 to limit the rotative stroke of shaft 24 and scraper 9. A stud 40 has its upper end riveted to and depends from lever 34, and is journalled in a bushing 41 of lubricant-containing metal. Sleeve 41 has a flange 42 between the hub of lever 34 and extends through stem 15.

A torsion spring 44 is coiled around stud 40 and includes a diametrically extending terminal 45, is removably seated in a cross groove 46 in the lower end of stud 40 and an arm 47 extending from the other end of the coil of spring 44. Arm 47 terminates in an upstanding leg 48 which abuts against one side of the shank 15. The spring is slidably removable from the stud 40 and shank 15 and is self-retaining in its operative position. The groove 46 is undercut as at 48 so the torsional stress applied to terminal 45 will hold the spring in connected relation to and on the stud 40. The leg 49 is slidable onto and off the stem. In applying the spring, the terminal 45 is inserted into the groove 46 in the lower end of stud 40, arm 47 is moved to put the spring under torsion and the leg 48 is moved into engagement with stem 15. The torsional stresses on terminal 45 will hold it seated in the undercut 48 of groove 46 and prevent accidental displacement of the spring from the stud. In removing the spring, the leg 49 is flexed off the shank so that the spring can unwind itself to release the tension thereon so that the terminal 45 can be withdrawn from stud 40.

The operation will be as follows: the bowl is dipped into ice cream, mashed potatoes or other material to be served or measured, while the lever 34 is in its normal position shown in Fig. 1. The spring 44 will hold lever 34 against stop 38. When the material is to be discharged from the bowl, the operator will exert thumb pressure on the piece 37 and swing the lever against the force of torsion spring 44 until the scraper is rotated about one-half revolution by said lever, and the thumb piece 37 is arrested by the handle. This will discharge the material from the bowl. When the lever is released by the user, the spring 44 will retract lever 34, shaft 24 and scraper 9 to its normal position.

In practice it is desirable to separate the operative parts from the handle and bowl for cleansing or repair. When this is desired, the arm 47 of spring 44 is first flexed to disengage leg 49 from stem 15 and permit said arm and leg to swing across the underside of the stem 15 to unwind the coil of the spring until it is not under tension. The terminal 45 can then be freely removed from the groove 48 so the entire spring can be disconnected from stud 40. Lever 34 will then be free to rotate shaft 24 and the scraper 9 into its discharging position so that the central portion of the scraper will be slightly above the edge of the bowl. The scraper will then be flexed to snap the pintle 28 out of its bearing 29 and to the outside of the bowl. The shaft 24 is then slidably shifted through its bearing 25, the pintle 26 is withdrawn from bearing 27 in head 14 and through the pinion 30 and the shaft is removed through the bearing 25 in the bowl. The stud 40 is then free to be slidably withdrawn from bushing 41 to disconnect the lever from the shank.

To assemble the disher, the stud 40 is passed through the bushing 41. The lever 34 is shifted to its discharging position and the shaft 24 is inserted through bearing 25 in the bowl and through the pinion 30 until the pintle 27 is in bearing 26 in the head 14. The outer end of the scraper is then flexed into the bowl and the trunnion 28 is snapped into its normal position. The coil of spring 44 is then placed around stud 40 with terminal 45 in groove 46. The arm 47 is then wound around the stud 40 to subject the spring to torsion, and the leg 49 is moved into engagement with the stem 15. The terminal 45 will be confined in the undercut 48 of groove 46 and hold the spring against displacement from the shank 24.

A characteristic of the lever 34 is that there is substantially no sliding friction between the terminal leg 49 and the shank, or between the terminal 45 and the stud, during the swinging movement of the lever 34. Another characteristic is that the spring 44 removably holds the stud against axial movement in the bushing 41 and is readily separable from said stud and the stem.

Another characteristic of the construction described is that the brazing of the stem in the head and the end plate on the handle, and the brazing of the stem in the offset in the reinforcing plate, provide rugged joints for permanently securing the bowl, stem and handle together, and the solder around the exposed portions of the joints between the stem and reinforcing plate and the bowl, prevents moisture from causing corrosion at said joints.

The invention is not to be understood as restricted to the details described since these may be modified within the scope of the appended claim without departing from the spirit and scope of the invention.

Having thus described my invention what I claim as new and desire to secure by Letters Patent is:

A disher comprising: a handle, a bowl, a stem between and fixed to the bowl and the handle, a rotatable shaft extending longitudinally of the stem, having one of its ends journalled in the handle and its opposite end journalled in the bowl, a scraper rotatable in the bowl and fixed to the end of the shaft journalled in the bowl, the shaft and scraper being removable from the bowl and the stem, a lever disposed for pivotal movement between and transversely of the stem and the shaft, separable gearing between the shaft and the lever for rotating the shaft, a cylindrical stud having one of its ends rigidly secured to the lever, journalled in and longitudinally slidable into and out of the stem, and having its opposite end projecting from the stem and provided with a cross-groove, a torsion-spring for retracting the lever, including a coil around the projecting end of the stud, a terminal on one end of the coil insertible into and removable from said cross-groove and a resilient arm on the opposite end of the coil having an offset terminal engaging the stem for holding the spring under torsion and the terminal on the coil in the cross-groove, said arm and offset being outside of the stem for access thereto and movable away from the stem for releasing the arm for releasing the torsion in the spring, the spring being removable from the stud when the torsion is released, the stud being slidable out of the stem when the shaft is removed from the handle and the bowl.

References Cited in the file of this patent
UNITED STATES PATENTS

| | | |
|---|---|---|
| 674,453 | Carter | May 21, 1901 |
| 1,049,585 | Honecker | Jan. 7, 1913 |
| 1,132,657 | Gilchrist | Mar. 23, 1915 |
| 1,826,818 | Palmer | Oct. 13, 1931 |
| 2,041,200 | Myers | May 19, 1936 |
| 2,085,381 | Myers | June 29, 1937 |
| 2,086,886 | Vass | July 13, 1937 |
| 2,498,331 | Bloomfield | Feb. 21, 1950 |
| 2,537,896 | Hinton | Jan. 9, 1951 |